(12) United States Patent
Leclerc et al.

(10) Patent No.: US 8,285,253 B2
(45) Date of Patent: Oct. 9, 2012

(54) METHOD FOR MANAGING A TELECOMMUNICATION NETWORK AND ASSOCIATED DEVICES

(75) Inventors: Brice Leclerc, Nozay (FR); Alberto Conte, Nozay (FR)

(73) Assignee: Alcatel Lucent, Paris (FR)

( * ) Notice: Subject to any disclaimer, the term of this patent is extended or adjusted under 35 U.S.C. 154(b) by 714 days.

(21) Appl. No.: 12/459,431

(22) Filed: Jul. 1, 2009

(65) Prior Publication Data

US 2010/0015950 A1   Jan. 21, 2010

(30) Foreign Application Priority Data

Jul. 17, 2008   (FR) ...................................... 08 04074

(51) Int. Cl.
*H04M 1/66*   (2006.01)
(52) U.S. Cl. ................. 455/411; 455/422.1; 455/426.1; 455/445; 455/432.2; 455/462

(58) Field of Classification Search ............... 455/411, 455/422.1, 426.1, 445, 432.2, 462
See application file for complete search history.

(56) References Cited

U.S. PATENT DOCUMENTS

| | | |
|---|---|---|
| 2003/0176186 A1 | 9/2003 | Mohammed |
| 2004/0204097 A1 | 10/2004 | Scheinert |
| 2007/0254620 A1 | 11/2007 | Lindqvist |
| 2008/0101283 A1* | 5/2008 | Calhoun et al. ............... 370/328 |
| 2008/0293382 A1* | 11/2008 | Lubenski et al. ............. 455/411 |
| 2009/0117876 A1* | 5/2009 | Inoue ............................ 455/411 |

* cited by examiner

*Primary Examiner* — Ajit Patel
*Assistant Examiner* — Yousef Rod
(74) *Attorney, Agent, or Firm* — Carmen Patti Law Group, LLC

(57) ABSTRACT

The invention pertains to a method for managing a telecommunication network, comprising at least one base station in which said at least one base station is located and authenticated through the use of at least one identification parameter for a landline of the telecommunication network to which the base station is connected.

10 Claims, 5 Drawing Sheets

| Landline number | Landline address | | | |
|---|---|---|---|---|
| | City | Street | Floor | Apt |
| 450261236 | Paris | 6 Rue de la paix | 1 | 1 |
| 223654890 | Neuilly | 128 avenue de saxe | 4 | 5 |

Fig.2

| Landline number | Authorized clients |
|---|---|
| | |
| 450261236 | 36547-36542-698521 |
| 223654890 | 36547-2541 |

Fig.4

METHOD FOR MANAGING A TELECOMMUNICATION NETWORK AND ASSOCIATED DEVICES

This application is based on and claims the benefit of French Patent Application no. 0804074 filed on 17 Jul. 2008, which is incorporated by reference herein in its entirety.

TECHNICAL FIELD

This invention is part of the field of telecommunication networks, and more particularly cellular telecommunication networks comprising a multitude of base stations. The evolution of these networks has led to a change in the size of their cells, so as to meet users' needs. Thus, in urban areas, the sizes of these cells is smaller, and access to the network is provided by pico base stations (PBS) or femto base stations (FBS) located inside (residential or commercial) buildings or in public spaces.

BACKGROUND

FIG. 1 depicts an example configuration of a mobile network comprising femto base stations. The femto base station 1 is connected to a modem 3 which is itself connected to a landline 5. Said landline is connected to a digital subscriber line access multiplexer (DSLAM) 7 connected to a network server 9.

Such a network may be divided into multiple parts:
- the local network 11 comprising the femto base station 1 and the modem 3,
- the access network 13 comprising the landline 5,
- the aggregation network 15 the multiplexer 7 (DSLAM),
- the mobile network 17 comprising an authentication, authorization and accounting (AA) server 9.

The local portion of the network may be owned by the operator, in which case the operator installs its base stations itself, but it might also not belong to the operator, in which case the users themselves purchase and install their own base stations, for example in their homes.

With such networks, the main problem for the operator is authenticating and locating the base stations 1 which it does not own and which are connected to the network, in order to ensure the safety of the network and to allocate the appropriate frequencies for the network to run properly.

Since the femto base station 1 is installed locally by the users, the operator must identify the femto base station 1 in order to grant it the right to access the network and to share its operating resources with said femto base station.

Additionally, the operator must locate the femto base station 1 in order to allocate the appropriate frequencies to it, and thereby to prevent possible interference with neighboring cells.

Different techniques are used in the state of the art to solve these problems.

With respect to allocating frequencies, the base stations may be equipped with GPS, which is a costly solution that does not work indoors. Neighboring frequencies may also be polled, but this increases the time it takes to start up the base station.

With respect to authentication, digital certificates may be inserted into the base station or a system with a SIM card may be used, but both of these solutions are costly.

Furthermore, another problem pertains to the confidentiality of calls. If two neighboring houses are both equipped with a base station, the user may connect either to his own base station or to his neighbor's. However, there is no way to guarantee him that his neighbor's base station has not been hacked and that his calls are being monitored. The user must therefore be able to trust the base station that is transmitting and encoding his telecommunications. Solutions found in the state of the art include spoofing detection systems and electronic padlocking in order to protect the base station's encryption keys and sensitive programs. However, these solutions are costly and do not completely eliminate the risk of hacking.

SUMMARY

One object of the invention is therefore to overcome the aforementioned disadvantages of the state of the art, and to provide a method for authenticating and locating base stations as well as strengthening the confidentiality of telecommunications.

To that end, the invention pertains to a method for managing a telecommunication network, comprising at least one base station in which said at least one base station is located and authenticated through the use of at least one identification parameter for a landline of the telecommunication network to which the base station is connected.

In a first embodiment, said at least one base station is a femto base station.

In a further embodiment, said method comprises the updating of a database containing at least one identification parameter for the network's landlines, and associated information for locating the connection point.

In a further embodiment, said method comprises the following steps of saving:
- receiving a save request from a base station connected to a landline of the network,
- identifying said landline of the network to which the base station is connected,
- determining the location of the connection point of the identified network landline,
- determining the radio configuration of the base station at said location,
- saving the location of the base station and said at least one identification parameter of the associated landline in a network access database.

In a further embodiment, said method comprises the following steps of saving:
- receiving a save request regarding a network landline that is capable of receiving a connection from a base station, said request comprising at least one identification parameter for said landline,
- determining the location of the connection point of the identified network landline,
- determining the radio configuration of the base station at said location,
- saving the location of the base station and said at least one identification parameter of the associated landline in a network access database.

In a further embodiment, said method, at the time when a base station is starting up or being reconfigured, the following steps of activation:
- receiving a resource request from a base station,
- checking that said request comes from a base station which is connected to a landline of the network and has been saved in said network access database,
- providing said base station with the resources to operate, based on the location of the base station, if the result of the check is positive.

In a further embodiment, said network access database comprises a list of user devices associated with at least one landline of the network.

In a further embodiment, the method comprises the following steps of adding a user device to the network:
- receiving a request to add the user device to the telecommunication network,
- checking that the add request comes from a femto base station which is both connected to a network landline and is saved as being associated with said user device in said network access database,
- adding said user device to the telecommunication network, if the result of the check is positive.

The invention further pertains to a telecommunication network server connected to a plurality of base stations in which locating and authenticating base stations relies on at least one identification parameter for a landline of the network to which the base station is connected.

In a further embodiment, said server comprises at least one processing means capable of carrying out the following steps of saving:
- receiving a save request from a base station connected to a landline of the network,
- identifying said landline of the network to which the base station is connected,
- determining the location of the connection point of the identified network landline,
- determining the radio configuration of the base station at said location,
- saving the location of the base station and said at least one identification parameter of the associated landline in a network access database.

In a further embodiment, said server comprises at least one processing means capable of carrying out the following steps of saving:
- receiving a save request regarding a network landline that is to which a base station is or will be connected, said request comprising at least one identification parameter for said landline,
- determining the location of the connection point of the identified network landline,
- determining the radio configuration of the base station at said location,
- saving the location of the base station and said at least one identification parameter of the associated landline in a network access database.

In a further embodiment, said server comprises at least one processing means capable of carrying out the following steps of activation:
- receiving a resource request from a base station,
- checking that said request comes from a base station which is connected to a landline of the network and has been saved in said network access database,
- providing said base station with the resources to operate, based on the location of the base station, if the result of the check is positive.

In a further embodiment, said server comprises at least one processing means capable of carrying out the following steps of adding:
- receiving a request to add the user device to the telecommunication network,
- checking that the add request comes from a femto base station which is both connected to a network landline and is saved as being associated with said user device in said network access database,
- adding said user device to the telecommunication network, if the result of the check is positive.

BRIEF DESCRIPTION OF THE DRAWINGS

Other characteristics and benefits of the invention will become apparent from the following description, given with reference to the attached drawings, which by way of a non-limiting example depict one possible embodiment.

In these drawings:

FIG. 2 is a table depicting an example embodiment of a landline database 5;

FIG. 4 is a table that depicts an example embodiment of a network access database;

The term "SIM" refers to the acronym "subscriber identification module";

The term "GPS" refers to the acronym "global positioning system";

the term "landline" refers to all sorts of signal transmission cables (copper cables, optical fibers, etc.)

The term "user device" refers to a telecommunication terminal (e.g. a telephone, PDA, or laptop computer) manipulated by the user in order to communicate over the network by means of base stations.

The term "connection point" refers to the end of the landline, where the base stations are connected.

The term "radio configuration" of the base station refers to the various settings that depend on location and pertain to radio transmissions, such as authorized transmission frequencies, authorized transmission power levels, or UMTS/LTE jamming codes. These settings generally depend on the radio technology that is used.

DESCRIPTION OF EMBODIMENTS

The various elements of the inventive device will now be described in greater detail, with reference to the figures. In these figures, identical elements are given the same reference numbers.

The main idea of the present invention is to authenticate and locate femto base stations (FBS) 1 of a telecommunication network by identifying the landline 5 to which they are connected.

The invention requires the use of a database that matches up all landlines 5 with their identification parameters. These parameters may be landline 5 numbers, and the addresses that correspond to these landlines' 5 connection points. FIG. 2 depicts an example embodiment of such a database. The first column corresponds to the landlines' 5 numbers, which may be a reference number or the telephone number that corresponds to the line. The second column is the address of the landline 5, comprising the floor and apartment number, or even the room number. Multiple FBSs 1 may be located within a single building, or even within a single apartment. Additional information may potentially be added to the database if needed or requested by the network operator. The database is maintained and updated by the employees of the network operator, which thereby guarantees the accuracy of the data.

Figure 1:
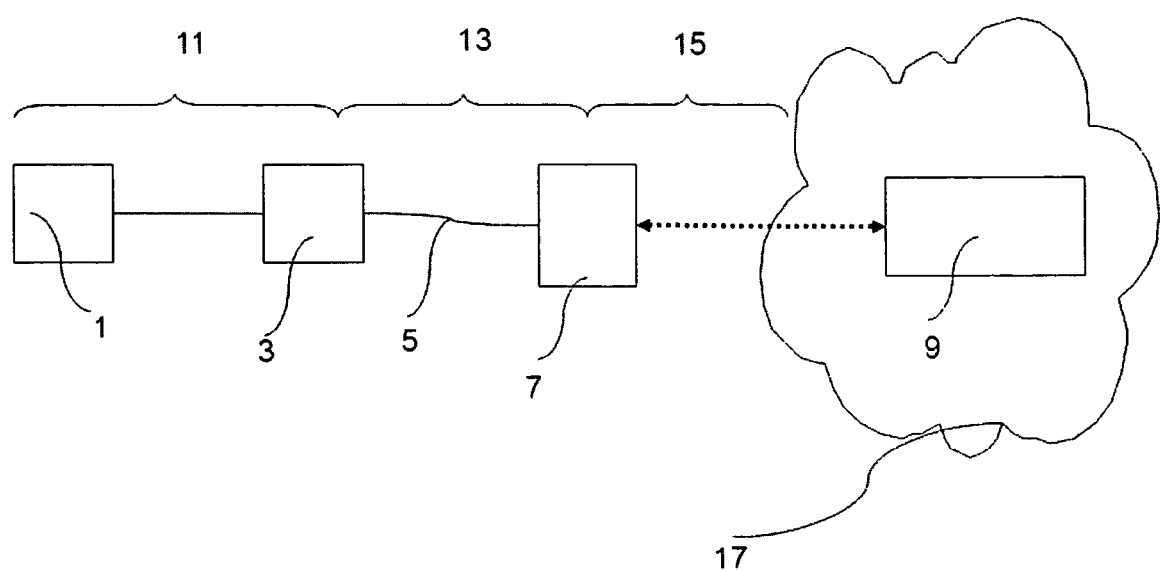
FIG. 1 is a diagram depicting one example configuration of a telecommunication network comprising femto base stations 1.
Figure 3:
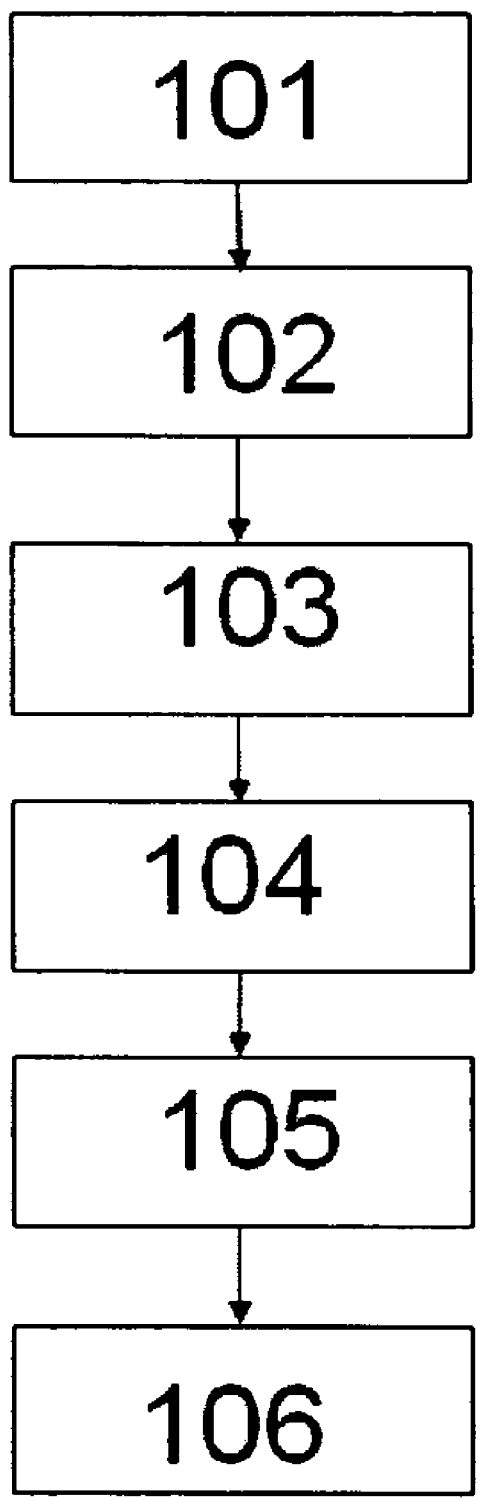
FIG. 3 depicts a block diagram of the various steps of saving according to the invention.

The invention may be divided into three main steps:
- a step of saving, carried out at least when the FBS 1 is first activated and every time said FBS 1 is connected to a new landline 5,
- a step of activation, at the time when the FBS 1 is started up or reconfigured,
- a step of adding the user device, The various steps of saving are depicted in FIG. 3.

The first step 101 pertains to the installation and connection of the FBS 1 by the user. A saving request is then sent to the server 9 (step 102). The server 9 detects and identifies the landline 5 to which the FBS 1 which sent the request is connected (step 103). Using the database described in FIG. 2, the server 9 may then locate the connection point of said FBS 1 requesting an activation (step 104). Based on this location and a list of frequencies used in the connection point's region, the server 9 may determine the transmission parameters (the transmission power and frequency, the jamming code, etc.) allowed at that location (step 105). The corresponding landline 5 is then saved in an authorized access line database (step 106), as depicted in FIG. 4. For the landlines 5 to be saved in the authorized access line database, the user must have previously sent a notification to the network operator in order to inform it of the landlines 5 to which the FBSs 1 that it trusts are connected. A user, of course, may be saved as trusting FBSs 1 which are connected to various landlines 5.

Figure 5:
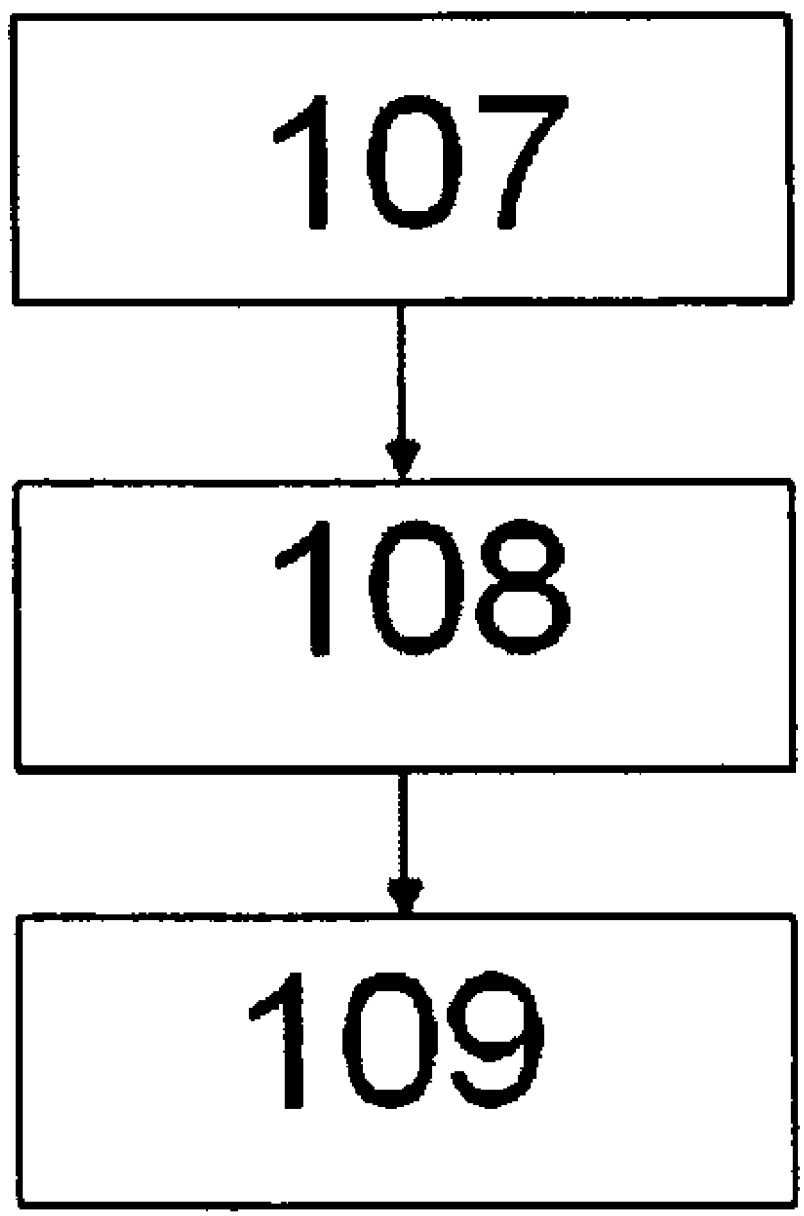
FIG. 5 depicts a block diagram of the various steps of activation according to the invention.

The steps of activation are shown in FIG. 5.

When starting up or being reconfigured, the FBS 1 sends a request to the server 9 in order to obtain operating resources based on its location (step 107). The server 9 then checks that the landline 5 to which the FBS 1 is connected is saved in the network access database (step 108). If so, the operating resources that depend on the FBS' location are made available to the FBS 1 (step 109).

Figure 6:
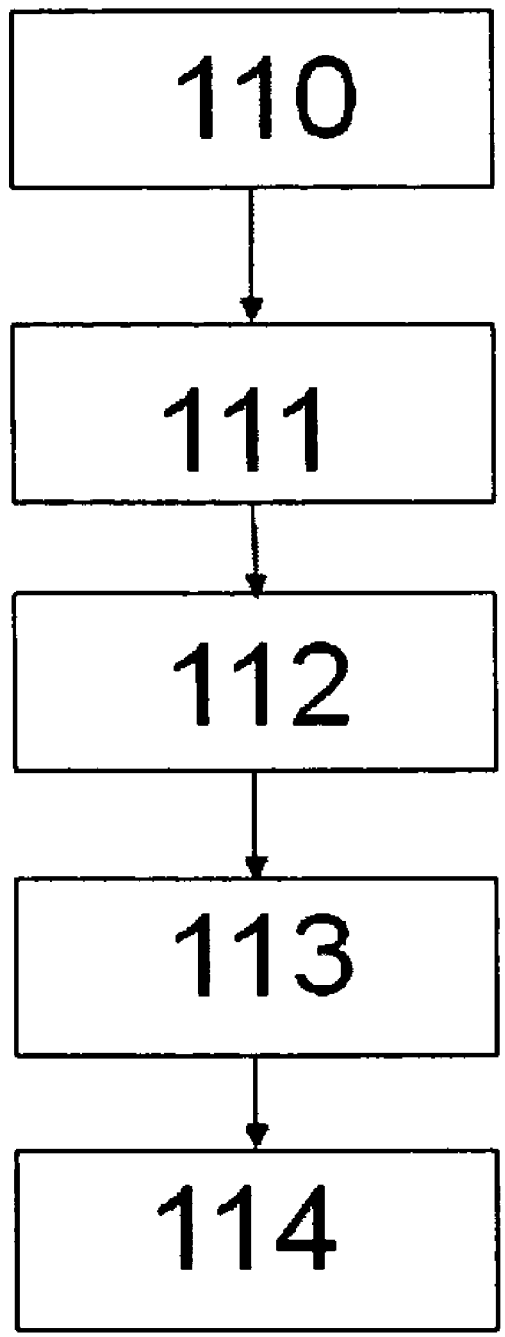
FIG. 6 depicts a block diagram of the various steps of adding according to the invention.

The steps of adding a user device to the network are given in FIG. 6.

Whenever a user device detects an FBS 1 (step 110), it attempts to join the network via that FBS 1 by sending an add request to said FBS 1 (step 111). Said request is then transmitted to the server 9 (step 112). The server 9 then identifies both the user device that wants to join the network and the landline 5 to which the FBS 1 where the add request is coming from is connected (step 113). If the user was recorded as trusting the FBSs 1 connected to that landline 5, said user device is then added to the network and may communicate freely (step 114).

In practice, when he registers with the network operator, the user defines the landlines 5 to which the FBSs 1 which he trusts will be connected. This data is saved in the network's databases. Thus, whenever the user moves and enters an area covered by a FBS 1 of the network (a handover), his device will automatically make an add request. However, if the FBS 1 which he attempts to join is not connected to a landline saved in the trusted list which he had previously defined, the request to add the device to the network will be rejected (or an alert message will be sent to him in order to tell him that his calls might not be confidential). This will therefore enable the user to obtain the desired level of confidentiality, by himself defining the base stations which he trusts. Returning to the example of the two neighboring houses, the user may either connect only to his own base station, or shall be notified that he is connected to his neighbor's base station and that a risk that his communications may be hacked exists. Additionally, as the invention relies on identifying the landline 5 to which the FBS 1 is connected, the FBS 1 may be a standard one, and thereby incur no additional costs in ensuring call confidentiality.

The invention therefore makes it possible, by identifying the landlines 5 and using a database containing the location of the connection points of these landlines 5, to ensure that the locations of the FBSs 1, and therefore their radio configurations, in particular the frequencies available, are reliable. This makes it possible to comply with frequency licenses and prevent any interference that could occur with neighboring cells. Furthermore, this enables the user to achieve a greater degree of confidentiality, by enabling him to choose his network access points himself.

The invention claimed is:

1. A method for managing a telecommunication network, comprising at least one base station in which said at least one base station is located and authenticated through the use of at least one identification parameter for landlines of the telecommunication network to which said at least one base station is connected, comprising the steps of:
- updating a database containing said at least one identification parameter of the landlines of the network and a connection point's associated location information,
- receiving a save request regarding a network landline that is capable of receiving a connection from a base station, said request comprising said at least one identification parameter for said network landline,
- determining a location of the connection point of the identified network landline,
- determining a radio configuration of the base station at said location, and
- saving said location of the base station and said at least one identification parameter of the associated landline in a network access database.

2. The method of claim 1, wherein said at least one base station is a femto base station.

3. A method for managing a telecommunication network, comprising at least one base station in which said at least one base station is located and authenticated through the use of at least one identification parameter for landlines of the telecommunication network to which said at least one base station is connected, comprising the steps of:
- updating a database containing said at least one identification parameter of the landlines of the telecommunication network and a connection point's associated location information,
- receiving a save request from a base station connected to a landline of the telecommunication network,
- identifying said landline of the telecommunication network to which the base station is connected,
- determining a location of the connection point of the identified telecommunication network landline,
- determining a radio configuration of the base station at said location, and
- saving said location of the base station and said at least one identification parameter of the associated landline in a network access database.

4. The method of claim 3, further comprising the steps of:
- receiving a resource request from said at least one base station at a time when said at least one base station is started or reconfigured,
- checking that said request comes from a base station which is connected to a landline of the telecommunication network and has been saved in said network access database, and providing the base station with resources to operate, based on the location of the base station, when a result of the check is positive.

5. The method of claim 3, wherein said network access database comprises a list of user devices associated with at least one network landline.

6. The method of claim 5, wherein said at least one base station is a femto base station, the method further comprising the steps of:
   receiving a request to add a user device to the telecommunication network,
   checking that the add request comes from a femto base station which is connected to a network landline and is saved as being associated with said user device in said network access database, and
   adding said user device to the telecommunication network when a result of the check is positive.

7. A telecommunication network server connected to a plurality of base stations in which locating and authenticating base stations relies on at least one identification parameter for a landline of a network to which one of the base stations is connected, wherein the telecommunication network server comprises at least one processing means configured to:
   receive a save request from a base station connected to a landline of the network,
   identify said landline of the network to which the base station is connected,
   determine a location of a connection point of the identified network landline,
   determine a radio configuration of the base station at said location, and
   save said location of the base station and said at least one identification parameter of the associated landline in a network access database.

8. The telecommunication network server according to claim 7, wherein the at least one processing means is configured to:
   receive a resource request from at least one base station,
   check that said request comes from a base station which is connected to a landline of the network and has been saved in said network access database, and
   provide the base station with resources to operate, based on the location of the base station, when a result of the check is positive.

9. A telecommunication network server connected to a plurality of base stations in which locating and authenticating base stations relies on at least one identification parameter for a landline of a telecommunication network to which one of the base stations is connected, wherein the telecommunication network server comprises at least one processing means configured to:
   receive a save request regarding a network landline to which a base station is or will be connected, said request comprising said at least one identification parameter for said network landline,
   determine a location of a connection point of the identified network landline,
   determine a radio configuration of the base station at said location, and
   save said location of the base station and said at least one identification parameter of the associated landline in a network access database.

10. The telecommunication network server according to claim 9, wherein the at least one processing means is configured to:
   receive a request to add a user device to the telecommunication network,
   check that the add request comes from a femto base station which is connected to a network landline and is saved as being associated with said user device in said network access database, and
   add said user device to the telecommunication network when a result of the check is positive.

* * * * *